United States Patent
Ito (10) Patent No.: US 8,444,852 B2
(45) Date of Patent: May 21, 2013

(54) MAGNETIC WATER ACTIVATOR

(75) Inventor: Yuko Ito, Kyoto (JP)

(73) Assignee: Clavis Japan Co., Kyoto-shi (JP)

( * ) Notice: Subject to any disclaimer, the term of this patent is extended or adjusted under 35 U.S.C. 154(b) by 592 days.

(21) Appl. No.: 12/515,529

(22) PCT Filed: Nov. 20, 2006

(86) PCT No.: PCT/JP2006/323121
§ 371 (c)(1),
(2), (4) Date: May 19, 2009

(87) PCT Pub. No.: WO2008/062504
PCT Pub. Date: May 29, 2008

(65) Prior Publication Data
US 2010/0032300 A1    Feb. 11, 2010

(51) Int. Cl.
*C02F 1/48* (2006.01)
*B29C 31/08* (2006.01)

(52) U.S. Cl.
USPC ............. 210/222; 29/469; 204/660; 204/664; 264/328.1

(58) Field of Classification Search
USPC ............................ 204/557, 660; 210/222, 695
See application file for complete search history.

(56) References Cited

U.S. PATENT DOCUMENTS

| | | | | |
|---|---|---|---|---|
| 5,320,751 | A | * | 6/1994 | Burns ............................ 210/222 |
| 5,394,131 | A | * | 2/1995 | Lungu ............................ 335/229 |
| 5,556,654 | A | * | 9/1996 | Fregeau ........................ 426/234 |
| 2005/0011363 | A1 | | 1/2005 | Janczak et al. |

FOREIGN PATENT DOCUMENTS

| | | |
|---|---|---|
| DE | 29807605 | 7/1998 |
| GB | 2257932 | 1/1993 |
| JP | H05-15997 | 4/1993 |
| JP | 10-057965 | 3/1998 |
| JP | 11-019650 | 1/1999 |
| JP | 2000-024671 | 1/2000 |
| JP | 2000-246255 | 9/2000 |
| JP | 2001-038361 | 2/2001 |
| JP | 2001-113283 | 4/2001 |
| JP | 2003-340460 | 12/2003 |

OTHER PUBLICATIONS

ISA/Japanese Patent Office, International Search Report of PCT/JP2006/323121, Dec. 20, 2006, 2 pages, Japan.
ISA European Patent Office, Search Report of EP 06 83 2971, Mar. 31, 2010, 1 page.

* cited by examiner

*Primary Examiner* — Patrick Ryan
*Assistant Examiner* — William Leader
(74) *Attorney, Agent, or Firm* — Alleman Hall McCoy Russell & Tuttle LLP (57) ABSTRACT

A magnetic water activator resistant to corrosion such as rusting while soft on the outside, and exhibiting excellent portability also from the view point of a profile. The magnetic water activator comprises a pair of magnetic circuit constituting members formed of a high magnetic permeability material and forming a partial annular shape in which one end of each member is coupled to each other rotatably with each recess side facing each other, a permanent magnet arranged along the recess side of each magnetic circuit constituting member, and a substantially annular elastic resin shell partially provided with a slit extending in the radial direction, and internally burying and holding the magnetic circuit constituting member and the permanent magnet in an airtight state.

7 Claims, 9 Drawing Sheets

MAGNETIC WATER ACTIVATOR

FIELD OF THE INVENTION

The present invention relates to a magnetic water activator for improving water quality using magnetism.

BACKGROUND ART

A magnetic water activator of this type improves water quality by causing magnetism to act on water, water on which magnetism acts by this magnetic water activator is generally referred to as "magnetically treated water", "magnetic water" or the like (hereinafter, "magnetically treated water").

The magnetically treated water exhibits effects of removing crystals (scales) of calcium carbonate or the like or red rust (ferric oxide) adhering to a water pipe and preventing corrosion of the water pipe due to formation of magnetite (triiron teroxide). Furthermore, it is well known that the magnetically treated water tastes good when a person drinks the water and that rice comes out nice and fluffy if the magnetically treated water is used as water for boiling the rice.

One explanation is that these phenomena result from change of water molecular clusters. Normally, the water is present as a group of certain water molecules called "clusters". If magnetism acts on the water, the clusters are divided into smaller clusters. As a result, the water increases in an osmotic pressure and exhibits the above-stated effects.

For example, the reason that the rice comes out nice and fluffy is as follows. If the rice is soaked in the magnetically treated water after washing the rice, sufficient water penetrates into the rice in less time than time required if ordinary water is used to cook the rice. Further, according to an increase in the osmotic pressure of the magnetically treated water, the water lethally acts on bacteria.

Many magnetic water activators have been proposed so far that range from a large-scale magnetic water activator requiring replacement of a feed pipe itself to a simplified magnetic water activator designed to be attached to an existing feed pipe so as to produce such magnetically treated water.

For example, a magnetic water activator described in Patent Document 1 can be easily installed to a feed pipe by wing screws. Further, Patent Document 2 describes a magnetic water activator designed to be able to be installed to feed pipes of various diameters by sliding a U-shaped coupling that holds a magnet. Moreover, Patent Document 3 describes a long and narrow magnetic water activator that appears as if the activator is formed by partially cutting a long cylindrical pipe. This magnetic water activator is configured to be installed to a feed pipe using elastic deformation of a holding body into which a long magnet is buried. To prevent magnetic leakage, a magnetic shielding cover in the form of a metal pipe covers a circumference of the magnetic water activator described in the Patent Document 3.

Patent Document 1: Japanese Unexamined Patent Publication No. 1999-19650.

Patent Document 2: Japanese Unexamined Patent Publication No. 2000-24671.

Patent Document 3: Japanese Unexamined Patent Publication No. 2003-340460.

DISCLOSURE OF THE INVENTION

Problems to be Solved by the Invention

Actually, however, consideration is hardly given to portability in conventional magnetic water activators including the three magnetic water activators described above. From viewpoints of a profile, first, the magnetic water activator of a shape close to a cube as described in each of the Patent Documents 1 and 2 or the large long and narrow magnetic water activator as described in the Patent Document 3 is quite inconvenient for portable use. Furthermore, it is obvious that no consideration is given at all to portability from the fact that each of the conventional magnetic water activators is hard and becomes rusty because of exposure of a metal base to a surface of the activator. Metals including permanent magnets and constituting the conventional magnetic water activators are made of a ferromagnetic material or the like and rust easily. Once these metals get rusty, a user is naturally reluctant to use the magnetic water activator for portable purposes. Besides, the exposure of the metal to the surface mars an appearance of the magnetic water activator and reduces safeness thereof. Moreover, there is a limit to improving the appearance.

In the meantime, some users who use magnetic water activators may want to use the magnetically treated water not only at home or at work but also while traveling or going on a business trip similarly to at home or at work. As can be understood and realized by a person once he or she uses a magnetic water activator, the user who has experienced high-quality magnetically treated water has a resistance to washing his or her hands in non-magnetically treated water or to drinking the non-magnetically treated water.

Considering these conventional problems, the present invention has been achieved while paying attention to a user's potential desire for this and is intended to provide a magnetic water activator excellent in portability, thereby making it possible for a user to readily use a magnetic water activator wherever the user is present.

Means Adapted to Solve the Problems

That is, a magnetic water activator according to the present invention is characterized by including: a pair of magnetic circuit constituting members made of a high magnetic permeability material, and having a partially annular shape in which respective ends of each of the magnetic circuit constituting members are rotatably connected to each other so that recess sides of the magnetic circuit constituting members face each other; permanent magnets arranged along interiors of the magnetic circuit constituting members; and an elastic resin shell having a generally annular shape partially including a slit extending in a radial direction, the magnetic circuit constituting members and the permanent magnets being buried and held in the shell in an airtight state.

According to the present invention constituted as stated above, the magnetic circuit constituting members and the permanent magnets are buried and held in the shell in the airtight state. Due to this, the magnetic water activator is quite convenient for portable use from respects including the fact that the corrosion such as rusting hardly occurs to the magnetic circuit constituting members and the permanent magnets, the fact that the shell is made of elastic resin and soft on the outside, the fact that the magnetic water activator has a flat annular shape as a whole, and the fact that it suffices to attach or detach the magnetic water activator to the feed pipe by opening the slit without using screws or the like. Furthermore, since the magnetic circuit constituting members can prevent magnetic leakage to the outside, a strong magnetic field is generated only between the permanent magnets. Therefore, a magnetic treatment can be performed efficiently and the magnetic water activator can be made small in size. The fact that the magnetic water activator can be made small in size can also contribute to improvement of portability.

Moreover, since the shell is made of elastic resin, a gripping force acting on the feed pipe increases, the magnetic water activator is break-proof even if being dropped or struck against a counterpart and damage or the like of the counterpart can be reduced. Further, a degree of freedom for design is high and an appearance of the magnetic water activator can be easily improved.

It is preferable that the permanent magnets are arranged to be eccentric toward the slit from the center of the shell in a natural state in which no external force acts on the magnetic water activator so that the permanent magnets face each other to form parallel magnetic lines of force effective for a magnetic treatment in a state of installing the magnetic water activator to the feed pipe. The permanent magnets, which are arranged to be slightly tilted to have a wider distance therebetween at a bottom than that at a top in the natural state, symmetrically face each other by installing the magnetic water activator to the feed pipe and opening the slit, thereby forming more parallel magnetic lines of force.

Preferably, the shell has a structure of a plurality of elastic resin layers. In that case, if different materials are used as the elastic resins of the layers for role sharing (for example, an outermost surface layer is excellent in grip property and an inner surface layer is excellent in deformation durability) or the like. By doing so, a degree of freedom for functional design can be improved and a high-quality magnetic water activator can be provided. Moreover, even if equivalent materials are used, design property can be improved by making the outermost surface layer transparent.

Preferably, a hole at a center of the shell has a long and narrow shape extending in the same direction as that of the slit so as to strengthen an installation force for installing the magnetic water activator to the feed pipe and to be able to install the magnetic water activator even to, for example, a feed pipe having a small diameter.

Examples of a method of manufacturing the magnetic water activator for improving airtightness and simplifying manufacturing steps include a method of manufacturing the magnetic water activator, including: forming a half having a shape obtained by dividing the shell in half in a thickness direction, bottomed fitting holes being formed in an end surface of the half so as to fit the magnetic circuit constituting members and the permanent magnets into the bottomed fitting holes; disposing the half having the magnetic circuit constituting members and the permanent magnets fitted into the bottomed fitting holes, in a molding box; and injecting elastic resin into the molding box, thereby forming the shell and burying the magnetic circuit constituting members and the permanent magnets into the shell.

Further, a method of manufacturing the magnetic water activator, including: forming a pair of halves each having a shape obtained by dividing the shell in half in a thickness direction, bottomed fitting holes being formed in an end surface of the half so as to fit the magnetic circuit constituting members and the permanent magnets into the bottomed fitting holes; and connecting the end surfaces to each other while sandwiching the magnetic circuit constituting members and the permanent magnets between the halves, thereby forming the shell and burying the magnetic circuit constituting members and the permanent magnets into the shell or the like may be used. If such a method is used, the two halves can be made identical in shape and a common die can be used for the halves.

Effect of the Invention

As can be understood, the present invention can provide a magnetic water activator resistant to corrosion such as rusting, soft on the outside, and quite excellent in portability from viewpoints of a profile. Furthermore, the present invention can facilitate manufacturing the magnetic water activator.

DESCRIPTION OF REFERENCE NUMERALS

1 Magnetic water activator
2 Magnetic circuit constituting member
3 Permanent magnet
4 Shell
4a Slit
4b Center hole Preferred Embodiments Of The Invention One embodiment of the present invention will be described hereinafter referring to the drawings.

Figure 1:
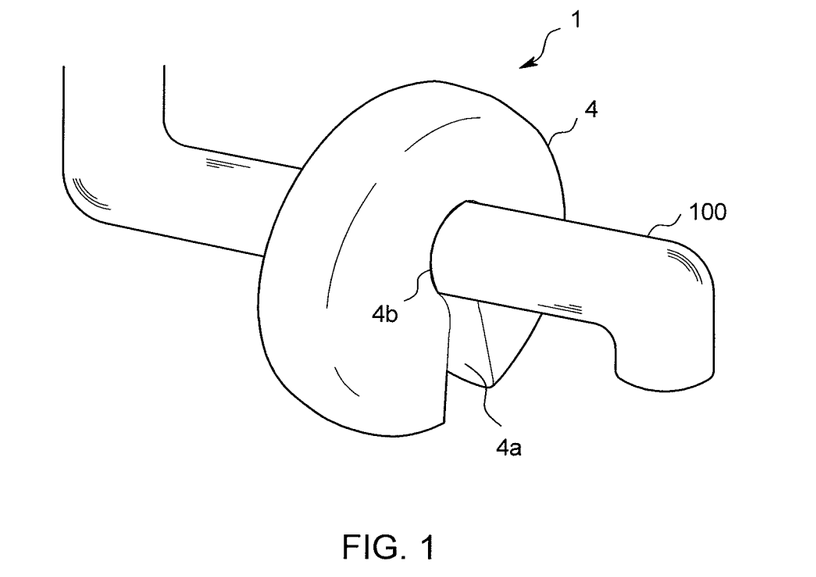
FIG. 1 is an installation state diagram showing a state in which a magnetic water activator according to one embodiment of the present invention is installed to a feed pipe.
Figure 2:
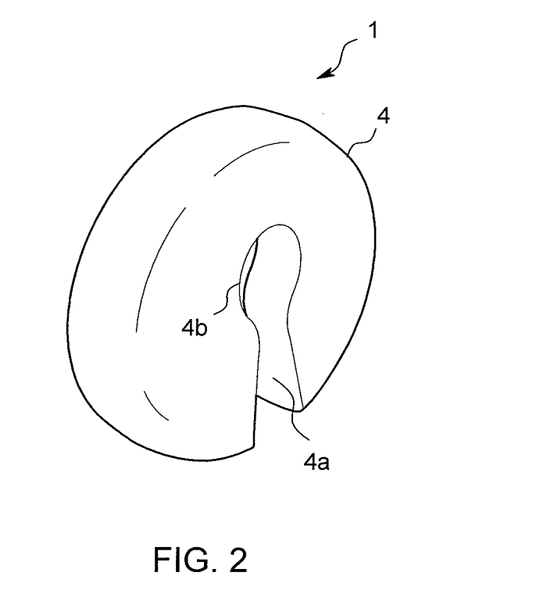
FIG. 2 is an overall perspective view of the magnetic water activator according to the embodiment shown in FIG. 1.
Figure 3:
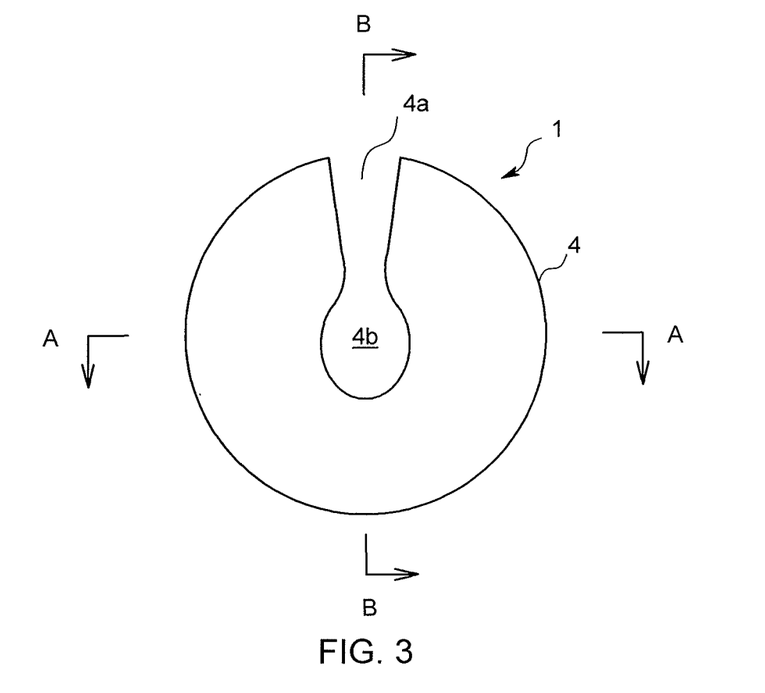
FIG. 3 is a plan view of the magnetic water activator according to the embodiment shown in FIG. 1.

A magnetic water activator 1 according to the present embodiment activates water by magnetism. As shown in FIG. 1, the magnetic water activator 1 is configured to be generally annular to partially include a slit 4a and to be detachable from a feed pipe 100 such as a faucet using the slit 4a.

Specifically, the magnetic water activator 1 includes a pair of magnetic circuit constituting members 2, a pair of permanent magnets 3 and an elastic resin shell 4 that internally buries and holds the magnetic circuit constituting members 2 and the magnets. The magnetic water activator 1 has a line-symmetric shape including an internal structure in a plan view (from an axial direction) with the slit 4a set as a centerline.

Figure 4:
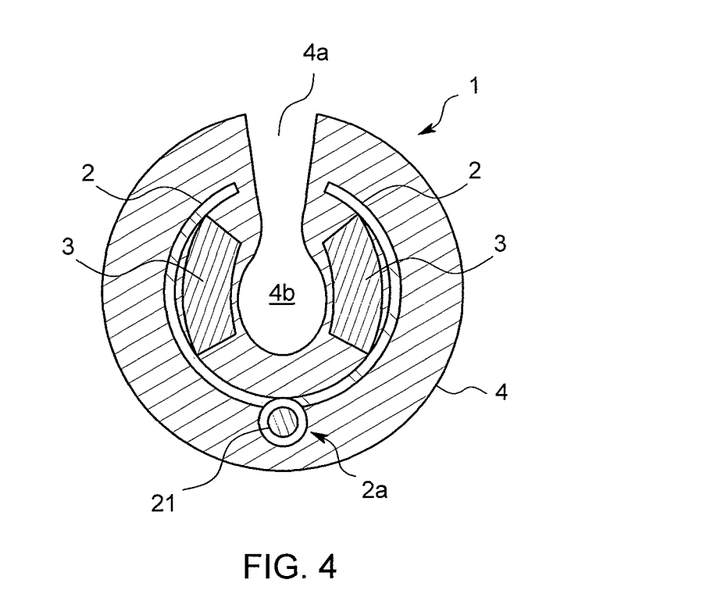
FIG. 4 is a cross-sectional view showing an internal structure of the magnetic water activator according to the embodiment shown in FIG. 1.
Figure 5:
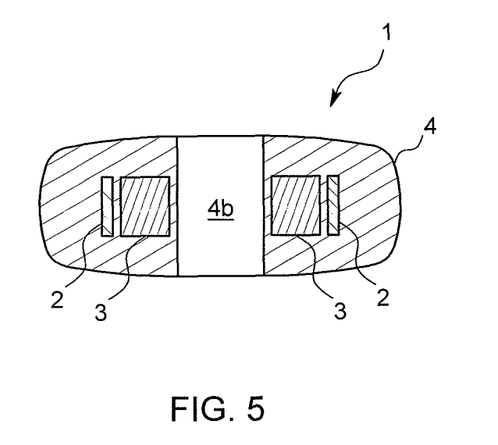
FIG. 5 is a cross-sectional view taken along a line A-A of FIG. 3.
Figure 6:
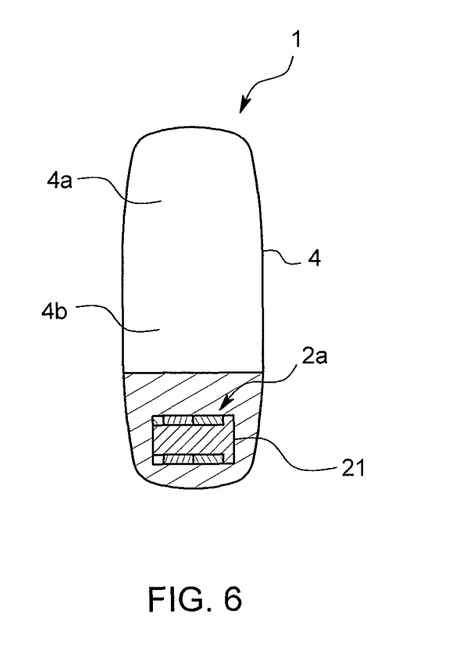
FIG. 6 is a cross-sectional view taken along a line B-B of FIG. 3.
Figure 7:
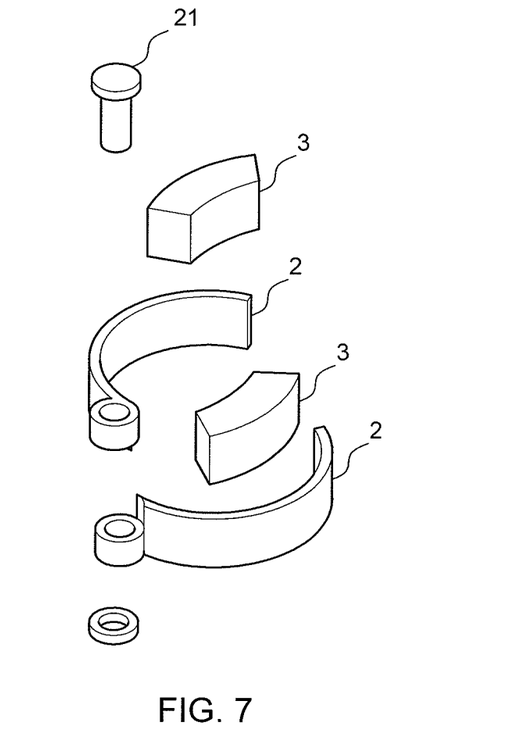
FIG. 7 is an exploded perspective view of magnetic circuit constituting members and permanent magnets according to the embodiment shown in FIG. 1.
Figure 8:
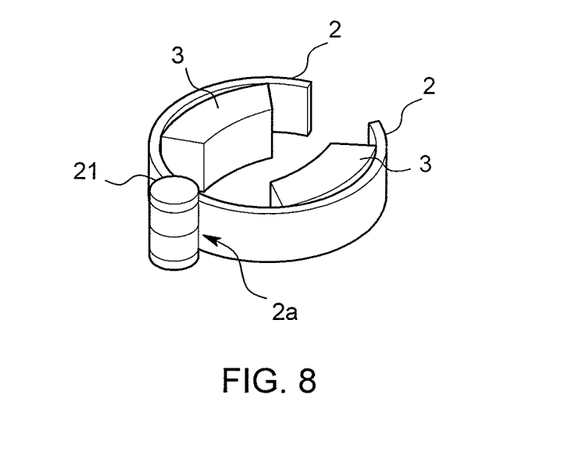
FIG. 8 is a perspective assembly diagram showing an assembly state of the magnetic circuit constituting members and the permanent magnets according to the embodiment shown in FIG. 1.

The constituent elements of the magnetic water activator 1 will be described. As shown in FIGS. 4, 7 and 8, each of the magnetic circuit constituting members 2 is generally semi-annular in a plan view and made of a high magnetic permeability material such as iron exhibiting ferromagnetism. The paired magnetic circuit constituting members 2 are arranged so that recess sides thereof face each other to form an annular shape as a whole. Further, the magnetic circuit constituting members 2 are coupled to each other only on one end by a hinge, whereby the magnetic circuit constituting members 2 are configured to be able to increase or diminish a distance between the other ends thereof. It is to be noted that a hinge connection portion 2a is configured so as not to deteriorate the magnetic permeability by using a high magnetic permeability material for a connecting pin 21 similarly to the magnetic circuits constituting members 2.

As shown in FIGS. 4, 7 and 8, the permanent magnets 3 are fan-like in a plan view to be arranged along the facing surfaces of the magnetic circuit constituting members 2, that is, arranged internally and substantially centrally (detailed arrangement will be described later). A material such as a neodymium-based material, a samarium-based material, a cerium-based material, alnico or ferrite is used for the permanent magnets 3. A height of each of the permanent magnets 3 is set almost identical to that of each magnetic circuit constituting member 2.

As shown in FIGS. 1 to 6 and the like, the shell 4 is made of elastic resin and generally annular to include the slit 4a arranged in a part of the shell 4 in a circumferential direction and extending in a radial direction. In the present embodiment, the shell 4 is shaped, like a donut, to be rounded without corners as a whole. A center hole 4b of the shell 4 has a long and narrow shape extending in the same direction as that of the slit 4a in a plan view. An inner wall surface of the center hole 4b is formed into a cylindrical inner surface shape perpendicular to the axial direction. This is intended to make a contact area of the center hole 4b as large as possible when the feed pipe 100 is sandwiched. As stated, the paired magnetic circuit constituting members 2 and the paired permanent magnets 3 are buried in the shell 4 in a state of hardly leaving space among the paired magnetic circuit constituting members 2 and the paired permanent magnets 3 and in a complete airtight state of no invasion of the air and water from outside. In a natural state in which no external force acts on the magnetic water activator 1, the permanent magnets 3 are arranged at positions slightly eccentric toward the slit 4a from a center of the shell 4 so as to be slightly tilted to have a wider distance therebetween at a bottom than that at a top as shown in FIG. 4.

A method of manufacturing the magnetic water activator 1 configured as stated above will next be described referring to FIGS. 9 to 12.

Basically, if this manufacturing method is used, fusion joining-type resin that becomes adhesive when being molten is used as the elastic resin.

Figure 9:
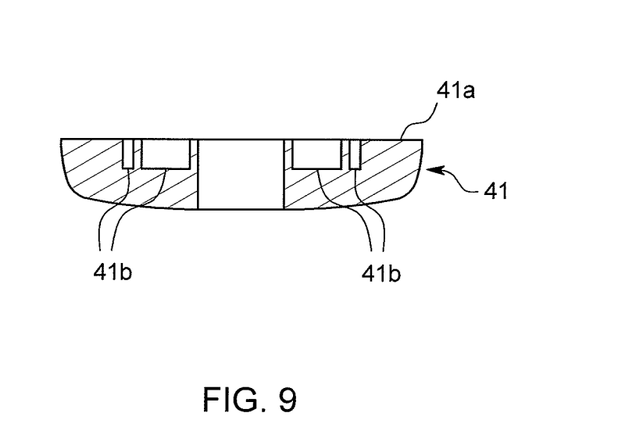
FIG. 9 is an explanatory diagram explaining procedures of manufacturing the magnetic water activator according to the embodiment shown in FIG. 1.

First, one half 41 of two halves obtained by dividing the shell 4 in half in a thickness direction is produced by, for example, die forming (see FIG. 9). This half 41 has bottomed fitting holes 41b being formed in an end surface 41a so as to fit the magnetic circuit constituting members 2 and the permanent magnets 3 into the bottomed fitting holes 41b up to a half height of the half 41.

Figure 10:
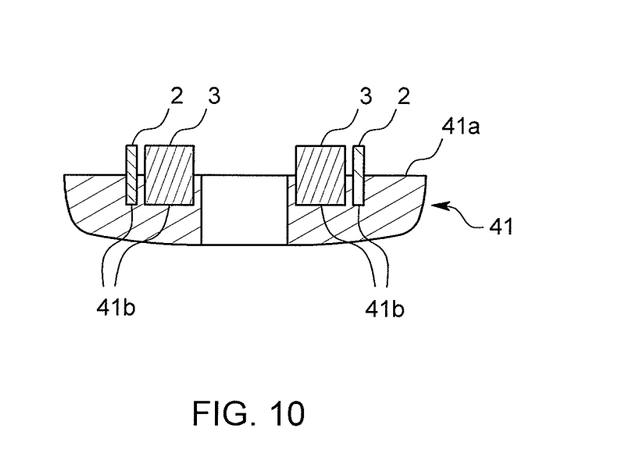
FIG. 10 is an explanatory diagram explaining procedures of manufacturing the magnetic water activator according to the embodiment shown in FIG. 1.

Next, the magnetic circuit constituting members 2 and the permanent magnets 3 are fitted into the bottomed fitting holes 41b (see FIG. 10).

Figure 11:
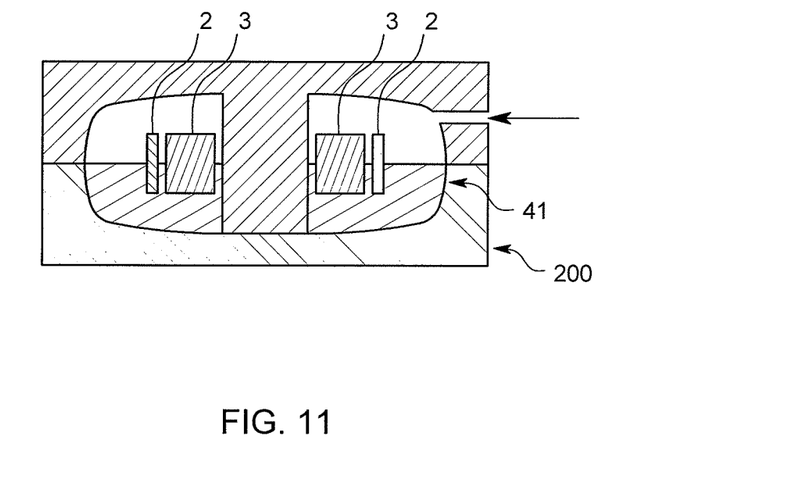
FIG. 11 is an explanatory diagram explaining procedures of manufacturing the magnetic water activator according to the embodiment shown in FIG. 1.

On the other hand, another molding box 200 that can constitute an overall external shape of the shell 4 is prepared and the half 41 is installed into the molding box 200 in a state of fitting the magnetic circuit constituting members 2 and the permanent magnets 3 into the half 41 (see FIG. 11).

Figure 12:
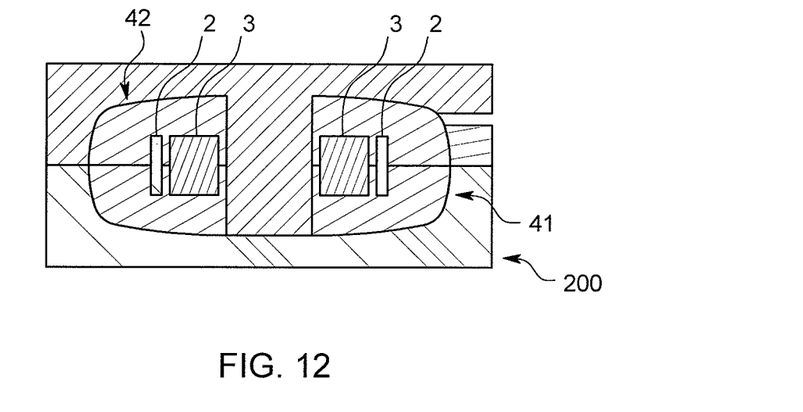
FIG. 12 is an explanatory diagram explaining procedures of manufacturing the magnetic water activator according to the embodiment shown in FIG. 1.

Finally, elastic resin in a molten state is injected into remaining space of the molding box 200 (see FIG. 12).

As a result, the other half 42 is formed to cover up one half 41 and fusion-bonded to the one half 41, thereby forming the shell 4. Furthermore, the magnetic circuit constituting members 2 and the permanent magnets 3 are buried into the shell 4 in a state of hardly leaving space among the magnetic circuit constituting members 2 and the permanent magnets 3 and in the airtight state from the outside.

In this way, according to the magnetic water activator 1 configured as stated above, the magnetic circuit constituting members 2 and the permanent magnets 3 are buried and held in the shell 4 in the airtight state, so that corrosion such as rusting hardly occurs to the magnetic circuit constituting members 2 and the permanent magnets 3. In addition, the magnetic water activator 1 is soft on the outside since the magnetic water activator 1 is covered with the elastic resin shell 4 and the magnetic water activator 1 has a flat annular shape as a whole. Due to this, the magnetic water activator 1 is quite excellent in portability. Furthermore, since the magnetic circuit constituting members 2 can prevent magnetic leakage to the outside, a strong magnetic field is generated only between the permanent magnets 3. Therefore, a magnetic treatment can be performed efficiently and the magnetic water activator 1 can be made small in size. The fact that the magnetic water activator 1 can be made small in size can also contribute to improvement of the portability.

Moreover, only by opening the slit 4a and externally fitting the magnetic water activator 1 into the feed pipe 100, the shell 4 sandwiches the feed pipe 100 by a flexible return force of the shell 4. Therefore, the magnetic water activator 1 can be installed to the feed pipe 100 quite easily and surely without need to use screws or the like. Conversely, the magnetic water activator 1 exhibits an advantage in that the magnetic water activator 1 can be detached easily. Besides, since the shell 4 is made of resin, a gripping force acting on the feed pipe 100 increases, a degree of freedom for design is high and an appearance of the magnetic water activator 1 can be easily improved.

Figure 13:
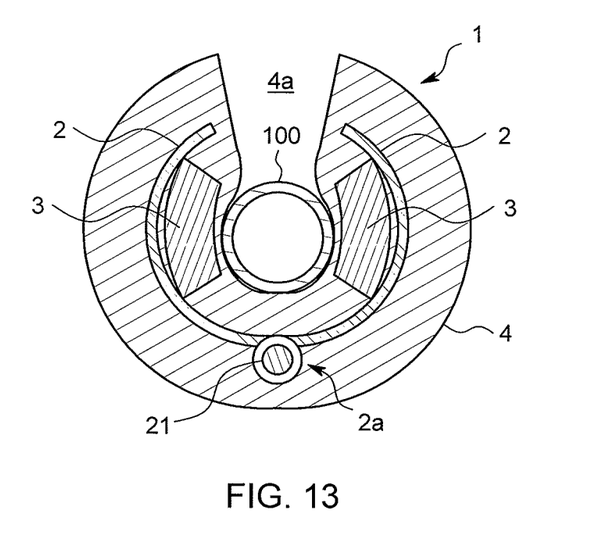
FIG. 13 is a cross-sectional view showing a state in which the magnetic water activator according to the embodiment shown in FIG. 1 is attached to a feed pipe.

The other advantages are as follows. In the natural state in which no external force acts on the magnetic water activator 1, the permanent magnets 3 are arranged to be eccentric toward the slit 4a from the center of the shell 4. Due to this, in a state of installing the magnetic water activator 1 to the feed pipe 100, the permanent magnets 3 symmetrically face each other and magnetic lines of force B effective for a magnetic treatment on the water are formed as shown in FIG. 13. Moreover, since the hole 4b located at the center of the shell 4 is formed into the long and narrow shape extending in the same direction as that of the slit 4a, the magnetic water activator 1 can be installed even to the feed pipe 100 having, for example, a small diameter. Besides, according to the manufacturing method, the halves 41 and 42 are fusion-bonded to enhance integrity of the shell 4. Due to this, the magnetic water activator 1 that can withstand many attachment/detachments, that is hardly susceptible to cracking and breaking and that has high mechanical durability can be manufactured.

It is to be noted that the present invention is not limited to the above-stated embodiment.

For example, the shell may be configured to include a plurality of elastic resin layers (such as two elastic resin layers). In that case, if different materials are used as the elastic resins of the layers for role sharing (for example, an outermost surface layer is excellent in grip property and an inner surface layer is excellent in deformation durability) or the like. By doing so, a degree of freedom for functional design can be improved and a high-quality magnetic water activator 1 can be provided. Moreover, even if equivalent materials are used, design property can be improved by making the outermost surface layer transparent. Further, there is no need to completely cover the internal elastic resin layer with the outermost surface elastic resin layer. The outermost surface elastic resin layer may be partially arranged from viewpoints of design, with views of improving gripping force or the like.

Figure 14:
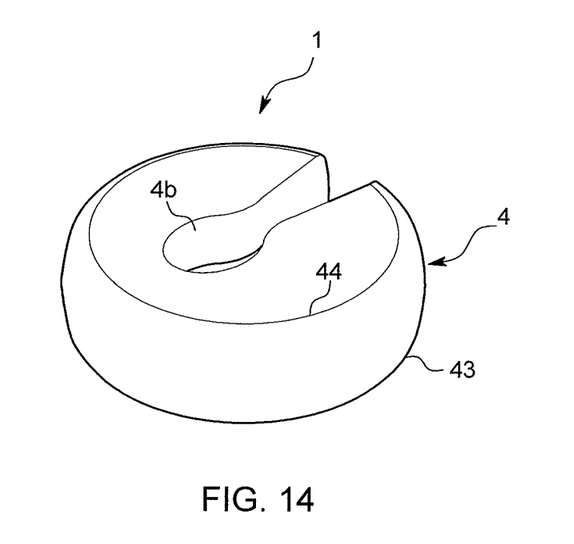
FIG. 14 is an overall perspective view of a magnetic water activator according to another embodiment of the present invention.
Figure 15:
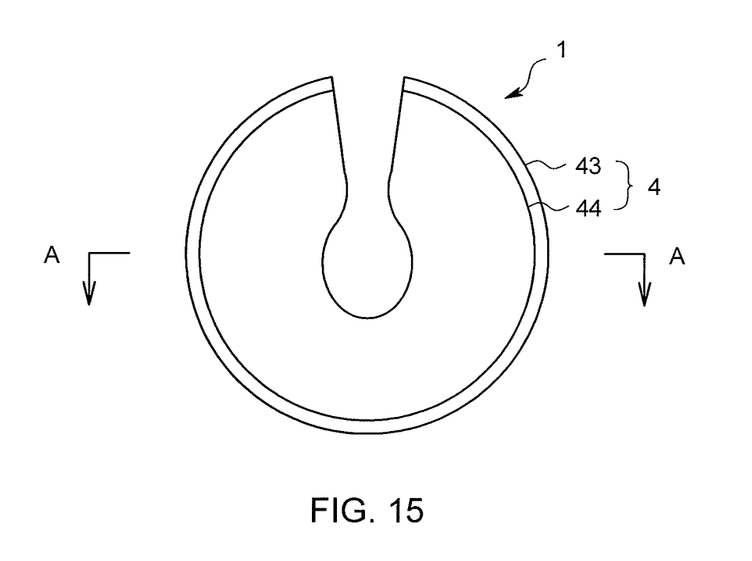
FIG. 15 is a plan view of the magnetic water activator according to the embodiment shown in FIG. 14.
Figure 16:
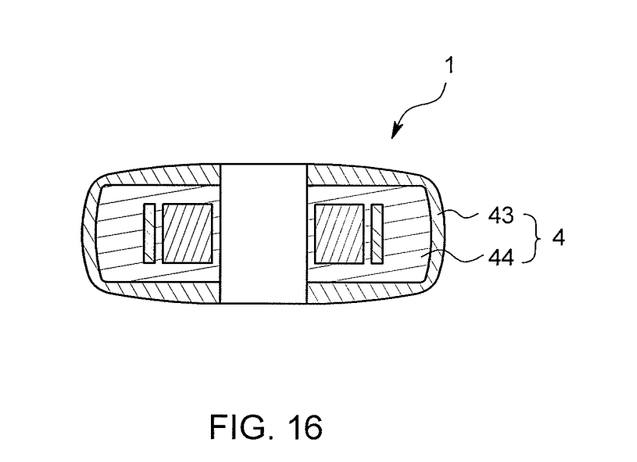
FIG. 16 is a cross-sectional view taken along a line A-A of FIG. 3.

As a specific example of the alternative, FIGS. 14 to 16 show the magnetic water activator 1 in which the shell 4 has a two-layer structure and in which an outermost surface layer is made of transparent resin. In these figures, reference symbol 43 denotes an elastic resin of the outermost surface layer and reference symbol 44 denotes an elastic resin of an inner surface layer. The other reference symbols are given similarly to the preceding embodiment.

Figure 17:
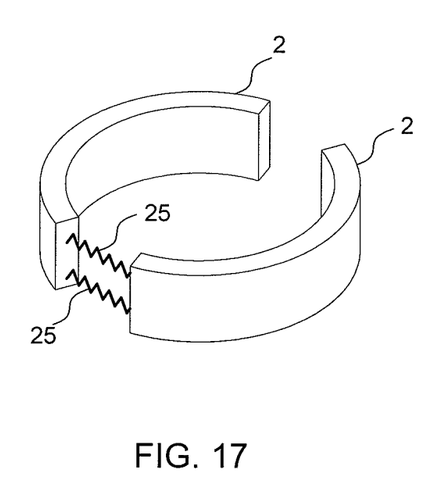
FIG. 17 is a perspective view showing magnetic circuit constituting members according to yet another embodiment of the present invention.

Further, the joint connecting the magnetic circuit constituting members to each other does not necessarily have a hinge connection structure stated above. Alternatively, the joint may be a joint such as a joint that allows movement of torsion between the magnetic circuit constituting members, that is, may be a universal joint configured so that a sphere is fitted into a recessed sphere or a joint that also allows a distance between ends of the magnetic circuit constituting members 2 to be increased or diminished, that is, a joint that connects like coil springs 25 (one example of the joint is shown in FIG. 17). In sum, it suffices to connect the magnetic circuit constituting members at least rotatably using a high magnetic permeability member having magnetic continuity and the joint may have a higher degree of freedom for connection.

In another alternative, the magnetic water activator 1 may be configured so as not to lose a gripping property even if the magnetic water activator 1 is wet by providing irregularities on an inner wall surface. Further, the overall shape of the magnetic water activator 1 is not limited to the annular shape but may be a rectangular annular shape or a hexagonal annular shape. The center hole may be rectangular or the like.

Furthermore, the present invention may be carried out so as to appropriately combine the configurations including those of the embodiments and can be variously changed and modified without departure from the spirit of the invention.

Industrial Applicability

According to the present invention, a magnetic water activator resistant to corrosion such as rusting, soft on the outside and excellent in portability from viewpoints of a shape can be provided.

What is claimed is:

1. A magnetic water activator comprising:
   a pair of magnetic circuit constituting members made of a high magnetic permeability material, respective ends of each of the magnetic circuit constituting members having a hinge connection portion being rotatably connected to each other;
   permanent magnets arranged along facing surfaces of the magnetic circuit constituting members; and
   an elastic resin shell having a generally annular shape partially including a slit extending in a radial direction, wherein all of the magnetic circuit constituting members containing the hinge connection portion and the permanent magnets are buried and held in the shell in an airtight state, and wherein when the slit is opened from an unbiased state in which no external force acts upon the shell to an opened state, the shell causes a flexible return force to act on the magnetic circuit constituting members, with the flexible return force facilitating a return from the opened state to the unbiased state.

2. The magnetic water activator according to claim 1, wherein
   the permanent magnets are arranged to be eccentric toward the slit from a center of the shell in a unbiased state in which no external force acts on the magnetic water activator.

3. The magnetic water activator according to claim 1, wherein
   the shell has a structure of a plurality of elastic resin layers.

4. The magnetic water activator according to claim 1, wherein
   a center hole of the shell has an elongate shape extending in a same direction as a direction of the slit.

5. A method of manufacturing the magnetic water activator according to claim 1, comprising:
   forming a first half of the shell having a half-shell shape in a thickness direction, with bottomed fitting holes being formed in an end surface of the first half so as to fit the magnetic circuit constituting members and the permanent magnets into the bottomed fitting holes;
   disposing the first half of the shell having the magnetic circuit constituting members and the permanent magnets fitted into the bottomed fitting holes, in a molding box; and
   injecting elastic resin into the molding box, forming a second half of the shell covering up the first half of the shell, thereby forming the shell and burying the magnetic circuit constituting members and the permanent magnets into the shell.

6. A method of manufacturing the magnetic water activator according to claim 1, comprising:
   forming a first and second half of the shell, each half having a half-shell shape in a thickness direction, with bottomed fitting holes being formed in an end surface of the first half of the shell so as to fit the magnetic circuit constituting members and the permanent magnets into the bottomed fitting holes; and
   connecting the end surfaces to each half of the shell to each other while sandwiching the magnetic circuit constituting members and the permanent magnets between the halves, thereby forming the shell and burying the magnetic circuit constituting members and the permanent magnets into the shell.

7. A magnetic water activator comprising:
   a pair of magnetic circuit constituting members made of a high magnetic permeability material, and having a partially annular shape in which respective ends of each of the magnetic circuit constituting members having a hinge connection portion are rotatably connected to each other so that recess sides of the magnetic circuit constituting members face each other;
   permanent magnets arranged along interiors of the magnetic circuit constituting members; and an elastic resin shell having a generally annular shape partially including a slit extending in a radial direction, wherein all of the magnetic circuit constituting members containing the hinge connection portion and the permanent magnets being buried and held in the shell in an airtight state, and wherein when the slit is opened from and unbiased state, in which no external force acts upon the shell, to an opened state, the shell causes a flexible return force to act on the magnetic circuit constituting members, with the flexible return force facilitating a return form the opened state to the unbiased state, the permanent magnets are arranged to be eccentric toward the slit from a center of the shell in the unbiased state in which no external force acts on the magnetic water activator, and a center hole of the shell has an elongate shape extending toward the slit.

\* \* \* \* \*

UNITED STATES PATENT AND TRADEMARK OFFICE
CERTIFICATE OF CORRECTION

PATENT NO.         : 8,444,852 B2
APPLICATION NO.    : 12/515529
DATED              : May 21, 2013
INVENTOR(S)        : Yuko Ito It is certified that error appears in the above-identified patent and that said Letters Patent is hereby corrected as shown below:

In the Claims

At Column 9, line 11, delete "form" and insert --from--.

Signed and Sealed this
Twenty-ninth Day of October, 2013

Teresa Stanek Rea
*Deputy Director of the United States Patent and Trademark Office*